United States Patent
Steinacker et al.

(10) Patent No.: US 9,806,992 B2
(45) Date of Patent: Oct. 31, 2017

(54) RE-ROUTING OF DIAMETER COMMANDS

(71) Applicant: Telefonaktiebolaget L M Ericsson (publ), Stockholm (SE)

(72) Inventors: Sven Steinacker, Aachen (DE); Gerasimos Dimitriadis, Thessaloniki (GR); Volker Kleinfeld, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 208 days.

(21) Appl. No.: 14/761,407

(22) PCT Filed: Mar. 22, 2013

(86) PCT No.: PCT/EP2013/056128
§ 371 (c)(1),
(2) Date: Jul. 16, 2015

(87) PCT Pub. No.: WO2014/146726
PCT Pub. Date: Sep. 25, 2014

(65) Prior Publication Data
US 2015/0358229 A1    Dec. 10, 2015

(51) Int. Cl.
*H04L 12/707* (2013.01)
*H04M 15/00* (2006.01)
(Continued)

(52) U.S. Cl.
CPC ............ *H04L 45/22* (2013.01); *H04M 15/66* (2013.01); *H04W 40/02* (2013.01); *H04L 63/08* (2013.01); *H04L 65/1016* (2013.01)

(58) Field of Classification Search
CPC ............. H04L 67/1025; H04L 67/1002; H04L 47/741; H04L 47/215; H04L 67/1012;
(Continued)

(56) References Cited

U.S. PATENT DOCUMENTS

2007/0153995 A1* 7/2007 Fang ............... H04M 15/00
379/114.03
2011/0075675 A1* 3/2011 Koodli ............... H04L 12/14
370/401
(Continued)

FOREIGN PATENT DOCUMENTS

| CN | 101355561 A | 1/2009 |
| EP | 2472829 A1 | 7/2012 |
| GB | 2481716 A | 1/2012 |

OTHER PUBLICATIONS

3rd Generation Partnership Project, "3rd Generation Partnership Project; Technical Specification Group Services and System Aspects; Policy and charging control architecture (Release 11)", Technical Specification, 3GPP TS 23.203 V11.8.0, Dec. 1, 2012, pp. 1-179, 3GPP, France.
(Continued)

*Primary Examiner* — Jung-Jen Liu
(74) *Attorney, Agent, or Firm* — Coats & Bennett, PLLC (57) ABSTRACT

The invention relates to a method, by a diameter routing unit (110), to route diameter commands of a data packet session using a diameter protocol in a mobile communications network, the diameter routing unit comprising a storage unit (111) storing information which policy and charging control unit is handling which data packet session and storing information about a presence of at least one additional diameter routing unit (100) which routes diameter commands of the diameter protocol to the same pool of policy and charging control units (31, 32) as the diameter routing unit. The method comprises the steps of receiving a diameter command for a data packet session; checking whether information is present in the storage unit (111) which policy and charging control unit is handling the session to which the received diameter command belongs, wherein, if information is present in the storage unit (111), the received
(Continued)

diameter command is forwarded to one of the policy and charging control units (31, 32) in accordance with the stored information, wherein, if no information can be found in the storage unit (101) for the received diameter command, the diameter command is forwarded to the at least one additional diameter routing unit.

17 Claims, 6 Drawing Sheets

(51) Int. Cl.
*H04W 40/02* (2009.01)
*H04L 29/06* (2006.01)

(58) Field of Classification Search
CPC ... H04L 47/125; H04L 67/32; H04L 12/5695; H04L 67/1031; H04L 41/0816; H04L 67/306; H04L 41/0893; H04L 45/14; H04L 69/08; G06F 9/5072; H04M 2215/204
See application file for complete search history.

(56) References Cited

U.S. PATENT DOCUMENTS

| | | | | |
|---|---|---|---|---|
| 2011/0314178 | A1* | 12/2011 | Kanode | H04L 63/0892 709/238 |
| 2012/0224524 | A1* | 9/2012 | Marsico | H04L 12/1407 370/315 |
| 2013/0064093 | A1* | 3/2013 | Ridel | H04L 47/125 370/236 |
| 2013/0322430 | A1* | 12/2013 | Mann | H04L 47/726 370/352 |
| 2013/0325941 | A1* | 12/2013 | Mann | H04L 45/304 709/204 |
| 2014/0068102 | A1* | 3/2014 | Mann | H04L 67/28 709/238 |
| 2014/0233389 | A1* | 8/2014 | Bantukul | H04L 47/127 370/236 |
| 2014/0237111 | A1* | 8/2014 | McMurry | H04L 67/1031 709/224 |

OTHER PUBLICATIONS

3rd Generation Partnership Project, "3rd Generation Partnership Project; Technical Specification Group Services and System Aspects; Policy and charging control architecture (Release 11)", Technical Specification, 3GPP TS 23.203 V11.9.0, Mar. 1, 2013, pp. 1-180, 3GPP, France.

Fajardo, E. et al., "Diameter Base Protocol", Internet Engineering Task Force (IETF), Request for Comments: 6733, Oct. 1, 2012, pp. 1-153, IETF.

China Telecom, "Discussion on PCRF addressing in a pair of DRAs deployment scenario", 3GPP TSG-CT WG3 Meeting #71, New Orleans, USA, Nov. 12, 2012, pp. 1-2, C3-121943, 3GPP.

3rd Generation Partnership Project, "3rd Generation Partnership Project; Technical Specification Group Core Network and Terminals; Policy and Charging Control signalling flows and Quality of Service (QoS) parameter mapping (Release 11)", Technical Specification, 3GPP TS 29.213 V11.5.0, Dec. 1, 2012, pp. 1-189, 3GPP, France.

* cited by examiner

RE-ROUTING OF DIAMETER COMMANDS

TECHNICAL FIELD

The invention relates to a method to route diameter commands of a data packet session by a diameter routing unit. The invention furthermore relates to the diameter unit configured to route diameter commands and to a method performed by a system of two diameter routing units to route diameter commands of the data packet session. The invention furthermore relates to the corresponding system comprising the at least two diameter routing units.

BACKGROUND

Figure 1:
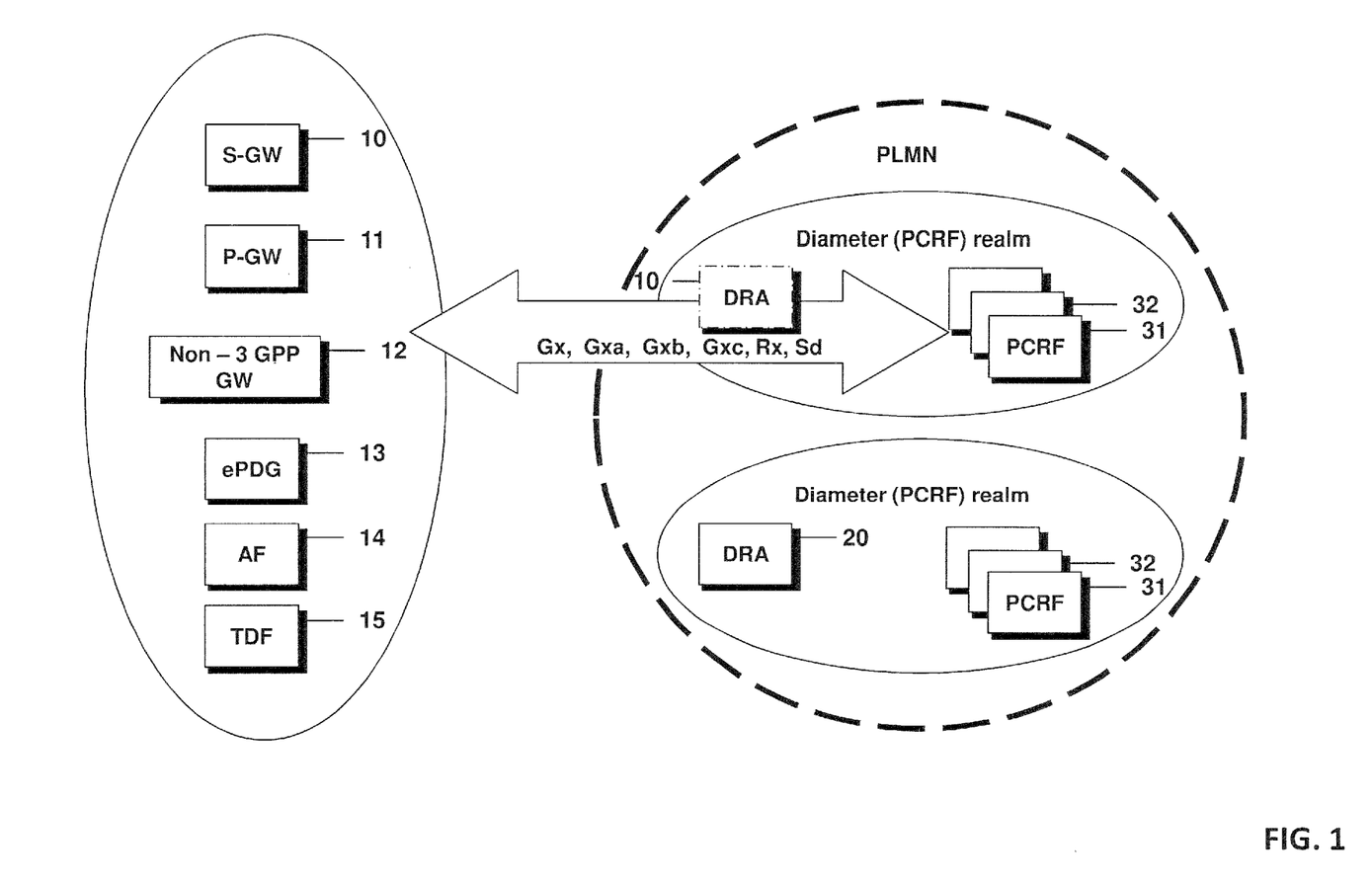
FIG. 1 is a schematic diagram showing the diameter routing agent as defined in 3GPP 23.203, FIG. 2 schematically shows a flow diagram showing the handling of diameter commands when a single DRA is used, FIG. 3 schematically shows the flow diagram exchange when two DRA's and two PCRF units are used.

3GPP defines a logical function Diameter Routing Agent (DRA) responsible for handling the Evolved Packet Core (EPC) and IP Mulitimedia Subsystem (IMS) interfaces Gx, Gxa, Gxb, Gxc, Rx and Sd. Reference is made to FIG. 1, a logic DRA such as DRA 10 or 20 serves a diameter realm comprising a single logic Policy Charging Rules Function (PCRF) unit, such as units 31, 32 that might be deployed by means of multiple and separately addressable PCRFs (see also 3GPP TS23.203, release 11). Diameter related commands may be received from the DRA 10, 20 from the entities shown on the left-hand side of FIG. 1, e.g. a serving gateway (S-GW) 10, a Packet Data Network Gateway, P-GW 11, any other non-3GPP gateway 12, from an evolved Packet Data Gateway ePDG 13, from an Application Function (AF) 14 or a Traffic Detection Function (TDF) 15.

A DRA serving two or more addressable PCRFs should be able to correlate AF service session information received over Rx interface with the corresponding IP-CAN (Internet Protocol Connectivity Access Network) session earlier received over the Gx interface (PCC—(Policy and Charging Control) session binding).

Figure 2:
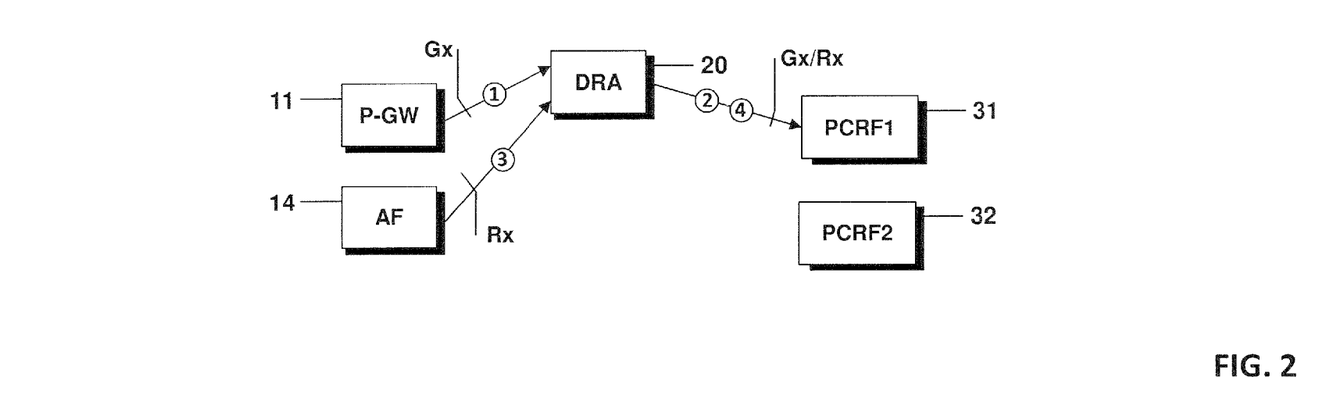

This is shown in further detail in FIG. 2. On an initial diameter command within a new IP-CAN session (step 1) DRA 20 selects one of the available and load-shared PCRFs 31, 32 and relays the command to PCRF, e.g. PCRF 31 in the example shown (step 2). The DRA 20 should be able to remember the selection for any subsequent command belonging to the same data packet session. A packet sent from an application function 14 over the Rx interface (step 3) that belongs to the same session should be relayed to the same addressable PCRF entity, here PCRF with reference numeral 31 (step 4). The other PCRF 32 is not able to handle subsequent commands belonging to the session because it has not been involved in any packet belonging to that session.

Figure 3:
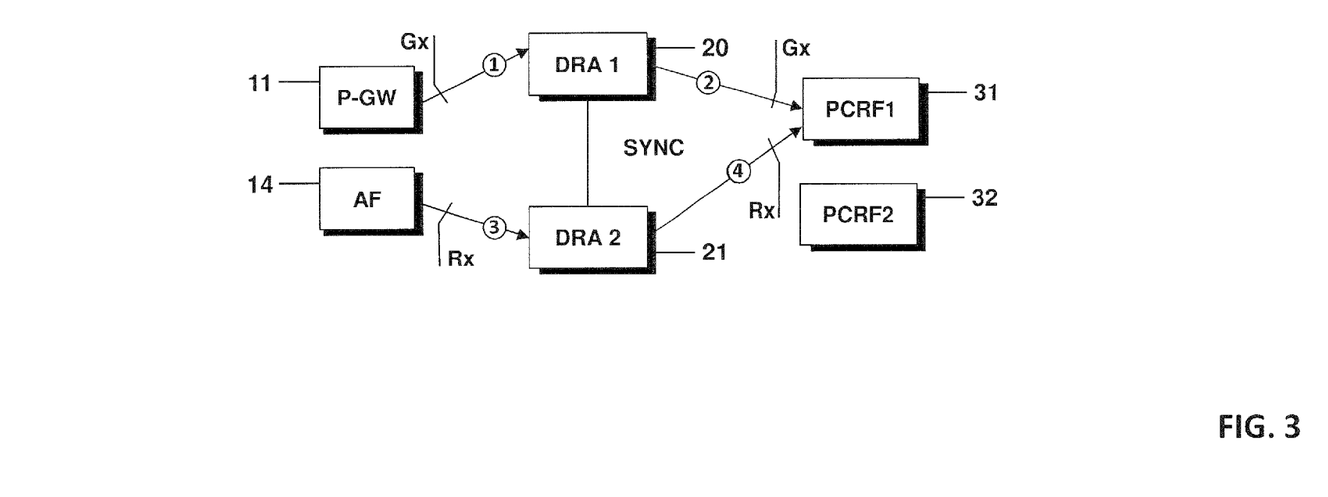

In practice, a logical DRA function can be deployed by means of two or more addressable DRA units, e.g. for load sharing or redundancy reasons. Such a situation is shown in FIG. 3. In this case, the gateway 11 and the application function 14 are free to pick any of the DRAs, DRA 20 or DRA 21, which are comprising a common logic DRA function.

Repeating the same use case as mentioned above, the P-GW 11 might send an initial diameter command of a new IP-CAN session to DRA 20 (step 1) while subsequent commands belonging to the same session might be sent to the other DRA, DRA 21 (step 3). DRA 21 now has to be able to deduce PCRF 31 in step 4 that was chosen by DRA 20. Otherwise, if DRA 21 relates to PCRF 32, the associated call would be broken as session information is not synchronized between PCRF 31 and PCRF 32.

Consequently, DRA 20 and DRA 21 require external data synchronization of some kind to be able to share the session information across all addressable DRAs that are part of a common logical DRA function. 3GPP 23.203 defines the network function DRA but does not mention the prior mentioned scenarios of two DRAs, mated DRAs. However, it is desirable to run DRAs as mated pairs in telecommunication networks in order to cater for failure redundancy.

One possibility to overcome this problem is the use of synchronization as symbolized by the sync connection in FIG. 3 between DRA 20 and DRA 21. However, this synchronization is problematic for several reason that will be explained below. DRA 20 must make sure that DRA 21 gets hold of session information from the IP-CAN session of step 1 before DRA 21 receives subsequent commands belonging to the session in step 3. The session information replication from DRA 20 to DRA 21 can take place either just before, after or simultaneously to relaying the diameter command to PCRF 31 in step 2. Replication can either be synchronous or asynchronous. If DRA 20 replicates session information to DRA 21 synchronously either just before, after or simultaneously to relaying to PCRF in step 2, delivery to PCRF 31 is delayed. DRA 20 has to wait for the geographical separated DRA 21 to commit the session information update. The session update time can significantly suffer with immediate impact on the other network entities and the user experience. If DRA 20 replicates session information to DRA 21 asynchronously this might lead to the situation that session information arrive at DRA 21 too late, so that no matching session information is found when the message is received in step 3 of FIG. 3. The user session is broken as DRA 21 cannot deliver to the right PCRF.

This leads to a dilemma. In both options, either performance or reliability is degraded to a level disparate with telecom grade signalling requirements. Another problem can be seen in the fact that even if session information is successfully replicated to the other DRA 21, DRA 21 might undergo a recovery (node failure/restart) and as a result lose its session information. Again, the user session is broken if subsequent commands are sent to DRA 21.

A further problem can be seen in the fact that session information might be replicated to DRA 21 through it is never going to be used, e.g. if all subsequent commands go to DRA 20. This would lead to superfluous traffic load between the two DRAs 20, 21.

SUMMARY

Accordingly, a need exists to overcome the problems mentioned above and to make sure that command received at a routing unit such as a diameter routing unit are forwarded to the right policy and charging control unit.

This need is met by the features of the independent claims. Further embodiments are described in the dependent claims.

According to a first aspect of the invention, a method is provided by a diameter routing unit to route diameter commands of a data packet session using a diameter protocol in a mobile communications network, the diameter routing unit comprising a storage unit storing information which policy and charging control unit is handling which data packet session and storing information about a presence of at least one additional diameter routing unit which routes diameter commands of the diameter protocol to the same pool of policy and charging control units as the diameter routing unit. According to one step of the method, a diameter command is received for a data packet session. Furthermore it is checked, whether information is present in the storage unit, which policy and charging control unit is handling the session to which the received diameter command belongs. If information is present in the storage unit, the received diameter command is forwarded to one of the policy and charging control units in accordance with the stored information. However, if no information can be found in the storage unit for the received diameter command, the diameter command is forwarded to the at least one additional diameter routing unit.

The diameter routing unit that receives a diameter command and checks in its storage unit where it is stored which data packet session is handled by which policy and charging control unit, whether information can be found which policy and charging control unit handles the session to which the command belongs. If the session information is provided in the storage unit the policy and charging control unit is identified and the command is forwarded to the identified policy and charging control unit. If the storage unit does not contain information about the session to which the received command relates, the diameter routing unit does not select, on its own, a policy and charging control unit with the risk of selecting the wrong policy and charging control unit, but forwards the diameter command to the at least one additional diameter routing unit, where information may be stored which policy and charging control unit is handling the corresponding session. This helps to avoid the routing of diameter commands to the wrong policy and charging control unit.

The invention furthermore relates to the corresponding diameter routing unit configured to route diameter commands of a data packet session using the diameter protocol in the mobile communications network. The diameter routing unit comprises a storage unit configured to store information which policy and charging control unit is handling which data packet session and to store information about a presence of at least one additional diameter routing unit, which routes diameter commands of the diameter protocol to the same pool of policy and charging control units as the diameter routing unit. The diameter routing unit furthermore comprises an input/output module configured to receive a diameter command for a data packet session. A control unit is provided configured to check whether information is present in the storage unit which policy and charging control unit is handling the session to which the received diameter command belongs. If the control unit determines that information is present in the storage unit for the received diameter command, the control unit is configured to forward the received diameter command to a policy and charging control unit in accordance with the stored information. If the control units determines that no information can be found in the storage unit for the received diameter command, the control unit is configured to forward the diameter command to the at least one additional diameter routing unit.

The forwarding itself initiated by the control unit may be carried out by the input/output module.

The invention furthermore relates to a method, performed by a system comprising at least two diameter routing units, to route diameter commands of a data packet session using the diameter protocol in the mobile communications network. Each of the at least two diameter routing units comprises a storage unit with stored information which policy and charging control unit is handling which data packet session and stored information about a presence of the other of the at least two diameter routing units. Furthermore, the at least two diameter routing units route diameter commands for data packet sessions to the same pool of policy and charging control units. According to one step of the method, one of the two diameter routing units receives the diameter command for data packet sessions. This one diameter routing unit then checks whether information is present in its storage unit which policy and charging control unit is handling the session to which the received diameter command belongs. If information is present in the storage unit of said one diameter routing unit, the received diameter command is forwarded to one of the policy and charging control units in accordance with the stored information. If, however, no information can be found in the storage unit of the diameter routing unit, the received diameter command is forwarded to the other of the at least two diameter routing units. At this other diameter routing unit it is checked whether information is present in the storage unit which policy and charging control unit is handling the session to which the received diameter command belongs. If information is present in the storage unit, the policy and charging unit is identified and the received diameter command is forwarded to the identified policy and charging control unit in accordance with the stored information.

In the case of two diameter routing units the information which policy and charging control unit was selected for a session is present in one of the two diameter routing units. If there are more than two diameter routing units, the other diameter routing unit, the second one receiving the diameter command from the first diameter routing unit may also determine that no information is found to its storage unit. The second one then also forwards the command to another diameter routing unit, the third one, which then checks whether, in its storage unit, information is present which policy and charging control unit is handling the session. This forwarding may be continued to the diameter routing unit which finally comprises the required information and which forwards the diameter command to the policy and charging control unit handling the corresponding session.

The invention furthermore relates to the corresponding system comprising the at least two diameter routing units which work as described above.

BRIEF DESCRIPTION OF THE DRAWINGS

The invention will be described in further detail with reference to the accompanying drawings.

DETAILED DESCRIPTION

In the following different embodiments will be discussed which provide a fast scalable and reliable solution for a situation where two or more diameter routing units serve more than one policy and charging control unit. It should be understood that each of the features discussed below might be used in the context described. However, it may also be used alone or in connection with any other feature described in the following detailed description.

Figure 4:
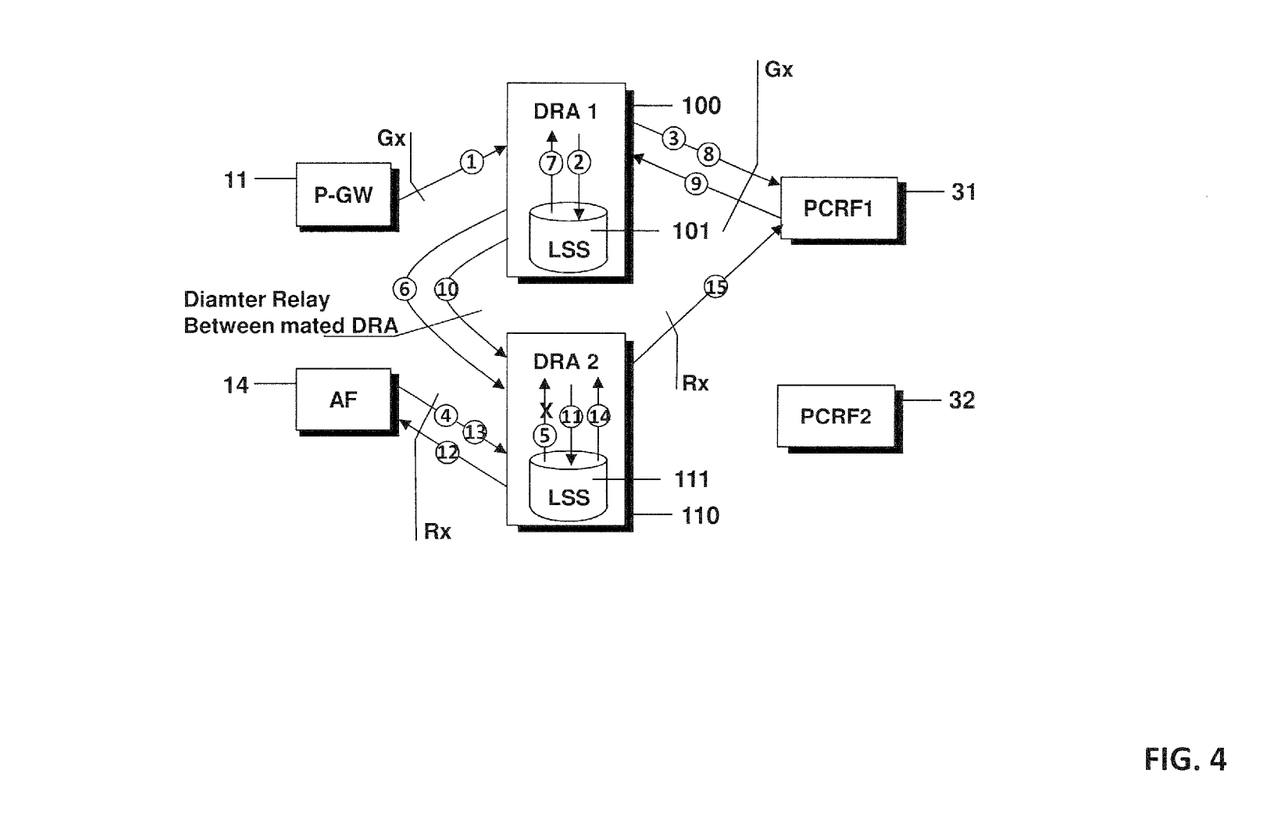
FIG. 4 shows a schematic diagram including the message flow where two diameter routing units forward diameter commands to more than one PCRF units according to an embodiment of the invention, FIG. 5 schematically shows a flow diagram in a situation where more than two diameter routing units are used.

FIG. 4 shows a situation similar to the one explained above in connection with FIG. 3. The system shown in FIG. 4 comprises a first diameter routing unit 100 comprising a storage unit 101. Furthermore, another diameter routing unit 110 is provided, the unit 110 also comprising a storage unit 111. Each of the storage units 101 and 111 comprises information which policy and charging control unit handles which data packet session. For this reason the storage unit is also named LSS (Local Session Storage). Each storage unit 101 and 111 furthermore comprises information about the presence of the corresponding other diameter routing unit. Thus, in the storage unit 101 the information is stored that the other diameter routing unit 110 is provided which also forwards diameter commands to one of the policy and charging control units 31, 32 (PCRF 1 or PCRF 2). The diameter routing unit 100 and the diameter routing unit 110 know that they are running as mated pairs. Also they share the knowledge about available addressable PCRF units 31, 32 serving a single logical PCRF. In the example shown two PCRF units 31, 32 are provided. However, it should be understood that more than two policy and charging control units may be provided.

Both diameter routing units store in their corresponding storage units, the PCRF that is selected for a particular IP-CAN session. The storage unit 101 or 111 can be a local storage entity that is dedicated for mated DRA re-routing and session discovery, but could also be shared with another session synchronization method between the different routing units as will be disclosed in further detail below.

In the example shown in FIG. 4, the P-GW 11 sends an initial diameter command of a new IP-CAN session to the diameter routing unit 100 (step 1). The diameter routing unit 100 detects the IP-CAN session to be a new session and is thus free to select any of the available PCRFs. The session is a new session as it contains a parameter indicating that it is an initial request. In the example shown it is PCRF 31. The routing unit 100 stores the selected PCRF in its local storage unit 101 (step 2) before it relays the Gx command to PCRF 31 (step 3). A packet or command sent later from the application function 14 over the Rx interface that belongs to the same IP-CAN session arrives at the second diameter routing unit 110 as shown in step 4. This diameter routing unit makes a local lookup in its storage unit (step 5), but fails to find the associated IP-CAN session which is maintained by the other diameter routing unit 100. The fact that the Rx command of step 4 does not contain a new IP-CAN session implies that the diameter routing unit 100 must have the session information as an IP-CAN session context is always first since it is responsible for setting up the bearer over which the AF connects to the DRA. In step 6 the diameter routing unit 110 relays the command to the diameter routing unit 100. The diameter routing unit 100 finds the associated PCRF through an LSS lookup (step 7) and relays the command to PCRF 31 (step 8).

Every diameter request command is answered with a corresponding answer command. The answer command from PCRF 31 is returned on the same path as it has been received using the diameter hop-by-hop identifier mechanism (step 9 and 10). The diameter routing unit at which the command was received intercepts the answer command on the return path of step 10 and inspects the diameter route record AVP (Attribute Value Pair) to discover the PCRF selected by diameter routing unit 100. The diameter routing unit 110 stores the AF services session information together with the identity of the selected PCRF 31 in its local storage (step 11) before eventually returning the answer command to the requesting application function in step 12.

Any subsequent command received over the Rx interface in step 13 belonging to the same AF service session can now be fetched from the local storage unit LSS 111 (step 14) and can be relayed directly to the serving PCRF 31 in step 15.

From the above discussed message flow the following generalized aspects may be deduced. An answer command of a policy and charging control unit may be received and the route record indicating the traffic path of the command in the answer command is checked to identify in the route record which policy and charging control unit was selected for the received diameter command, wherein information is stored in the storage unit which policy and charging control unit was selected for the received diameter command. This feature is reflected by steps 9 to 11 as described above.

In the above described example, the diameter routing unit 110 intercepts the route record AVP in the returned answer command. This allows the diameter routing unit 110 to detect the PCRF chosen by the other diameter routing unit 100, but might lack other session-related information created by the other diameter routing unit 100.

The answer command may also contain additional information relevant to the data packet session. The control unit is configured to decode the additional information and to write it into the storage unit. As additional information subscriber identification (MS-ISDN or IMSI), the access point name APN carried in the PDU information AVP, and the P-GW realm in case of overlapping IP address spaces for different P-GWs or the IPCAN IP address may be present.

In order to pass also other session-related information form diameter routing unit 100 to diameter routing 110, it is possible that the diameter routing unit 100 encodes the LSS data record associated with the IP-CAN session in a suited AVP or diameter AVP group and piggy-back it to the answer command to the other diameter routing unit 110 in step 10 of FIG. 4. The receiving diameter routing unit 110 detects the piggy-back AVP or AVP group and decodes and writes the contained session information to its local storage 111. The diameter routing unit 110 strips the piggy-back AVP or AVP group off the received answer command and relays the original message to the application function. This means that the attached attribute value pair is private to the pool of diameter routing units forming a single logical diameter routing agent function. This implies that the attached AVP should be removed from the command by the diameter routing agent and the pool that forwards to the application function.

In more general terms, this means that the above described method comprises the step of receiving an answer command to which an attribute value pair is attached, the attribute value pair comprising information which policy and charging control unit is handling which data packet session. This information is decoded and then written into the local storage unit. The attribute value pair may comprise a complete set of available pieces of information describing the policy and charging control units for all the sessions handled by the diameter routing unit which is attached as AVP to the answer command. However, it should be understood that in dependence on the number of the controlled sessions, the piggy-back information may also comprise only a part of the available information.

Furthermore, the method comprises the step of removing the attached attribute value pair before the answer command is sent to the node for which the diameter command was received, here the application function 14.

In the embodiment shown above the command in step 4 is received from the application function 14. However, it should be understood that it may be received from any other unit shown in FIG. 1 on the left-hand side, be it any of the gateways 10-13 and/or detection traffic function unit 15. Furthermore, as can be deduced from the above, the answer command of the policy and charging control unit is received from the at least one additional diameter routing unit to which the diameter command was initially forwarded.

Figure 5:
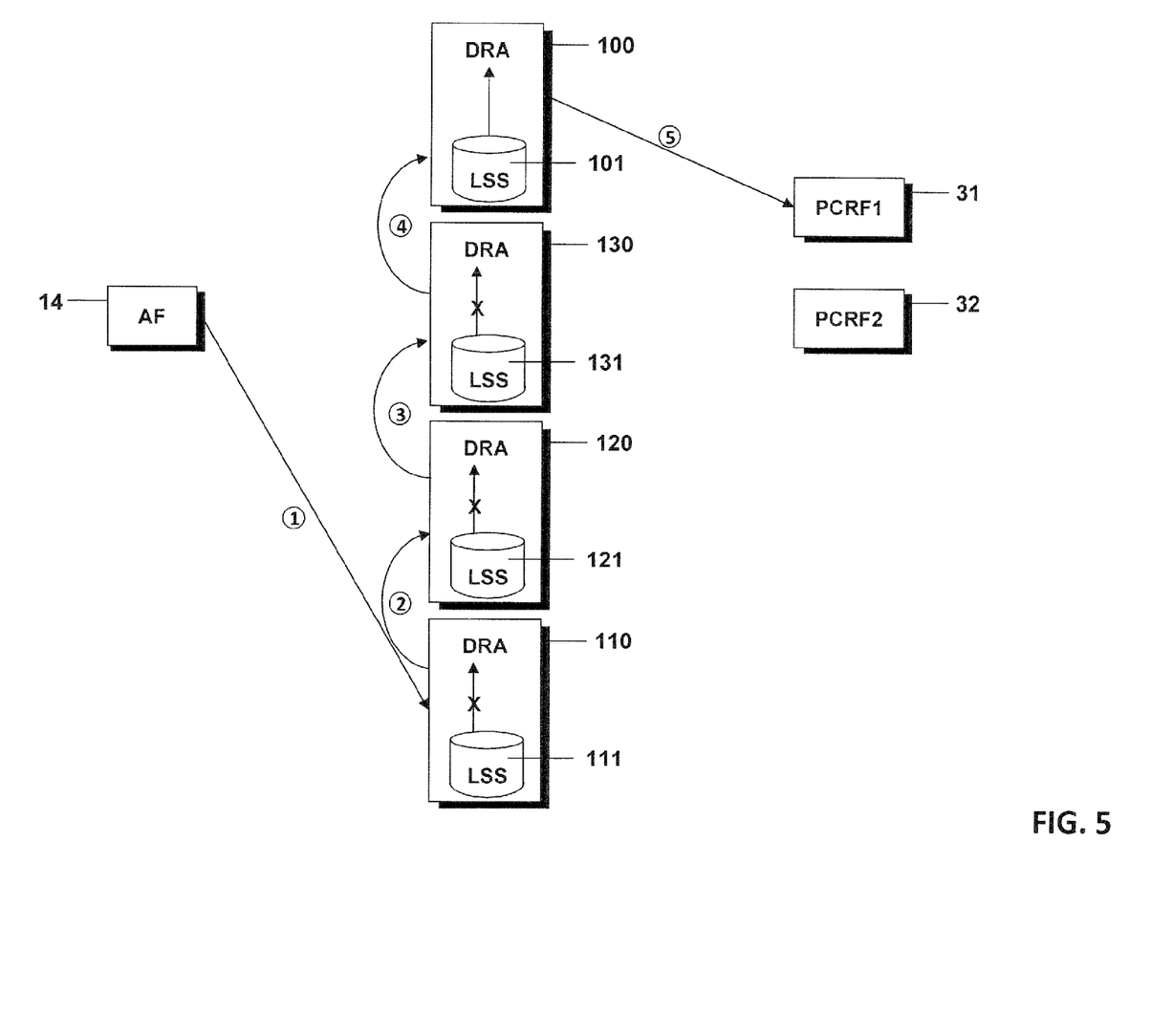

As will be discussed in connection with FIG. 5, the mated DRA re-routing and session discovery is applicable to more than two mated addressable DRA units. In the example shown in FIG. 5, four diameter routing units 100-130 are shown. In step 1 as shown in FIG. 5, a diameter command is received in a first step by the diameter routing unit 110. This step 1 of FIG. 5 corresponds to step 4 as discussed above in connection with FIG. 4. The diameter routing unit 110 then checks its local storage unit and detects no information for the IP-CAN session. It, thus, forwards the command received in step 1 in a second step to one of the other diameter routing units, in the example as shown to diameter routing unit 120. The method differs from the distribution of the relay message discussed above in connection with FIG. 4 by the fact that the diameter routing unit 110 selects any of the mated DRA peers. If the target DRA, here the DRA 120, also does not contain session information for the AF service session in question, this step is repeated in steps 3 and 4 until information has been found or all the DRAs and the mated DRA peer group have been visited. In the example shown in FIG. 5, the related CAN session information is finally found in DRA 100, which then forwards the received command in step 5 to PCRF 31.

The diameter route-record AVP can be used to avoid relaying to already visited diameter routing units in the mated DRA peer group and helps to detect failure cases in which none of the DRAs maintains the needed session information. For N mated DRA peers a diameter request command is relayed N−1 times in the worst case, it is relayed N−1/2 on average. The growth rate is O(N)=N.

In more general terms, when at least two additional diameter routing units are provided and one of them receives the diameter command, and when no information can be found in the storage unit for the received diameter command in the first visited diameter routing unit, the received diameter command is forwarded to one of the at least two additional diameter routing units. In other words, when the system comprises more than two diameter routing units and when no information can be found in the storage unit for the diameter command in a first one of the diameter routing units, the diameter command is forwarded to a second diameter routing unit, where it is checked by the second diameter routing unit whether information is present in its storage unit which policy and charging control unit is handling this session to which the received diameter command belongs. If no information can be found in the storage unit for the received diameter command at the second diameter routing unit, the diameter command is forwarded to a third diameter routing unit where it is checked whether information is present in the storage unit which policy and charging control unit is handling the session to which the received diameter command belongs. If information is present in the storage unit of the third diameter routing unit, the received diameter command is forwarded to the identified policy and charging control unit.

The above described methods and systems can be used in parallel with an asynchronous session state replication mechanism. Both mechanisms complement each other avoiding the problem of potentially unreliable asynchronous session state replication. When the asynchronous replication is used in addition to the above described features, the situation where the diameter routing unit at which a diameter command is received does not have information in the storage unit concerning the session, becomes less frequent as an asynchronous replication is carried out. However, nevertheless, when the diameter routing unit does not find session-related information for the received diameter command, it forwards the command to the other diameter routing unit. In more general terms, this means that an asynchronous replication of the information stored in the storage unit to a storage unit of at least one additional DRA is carried out.

The above described re-routing and session discovery is at least applicable to all DRA interfaces and network functions defined in 3GPP 23.203. These include the interfaces Gx, Gxa, Gxb, Gxc, Rx and SD as well as the network functions shown on the left side of FIG. 1, the gateways 10-13, the application function 14 and the TDF 15 as well as the PCRF 31, 32.

Figure 6:
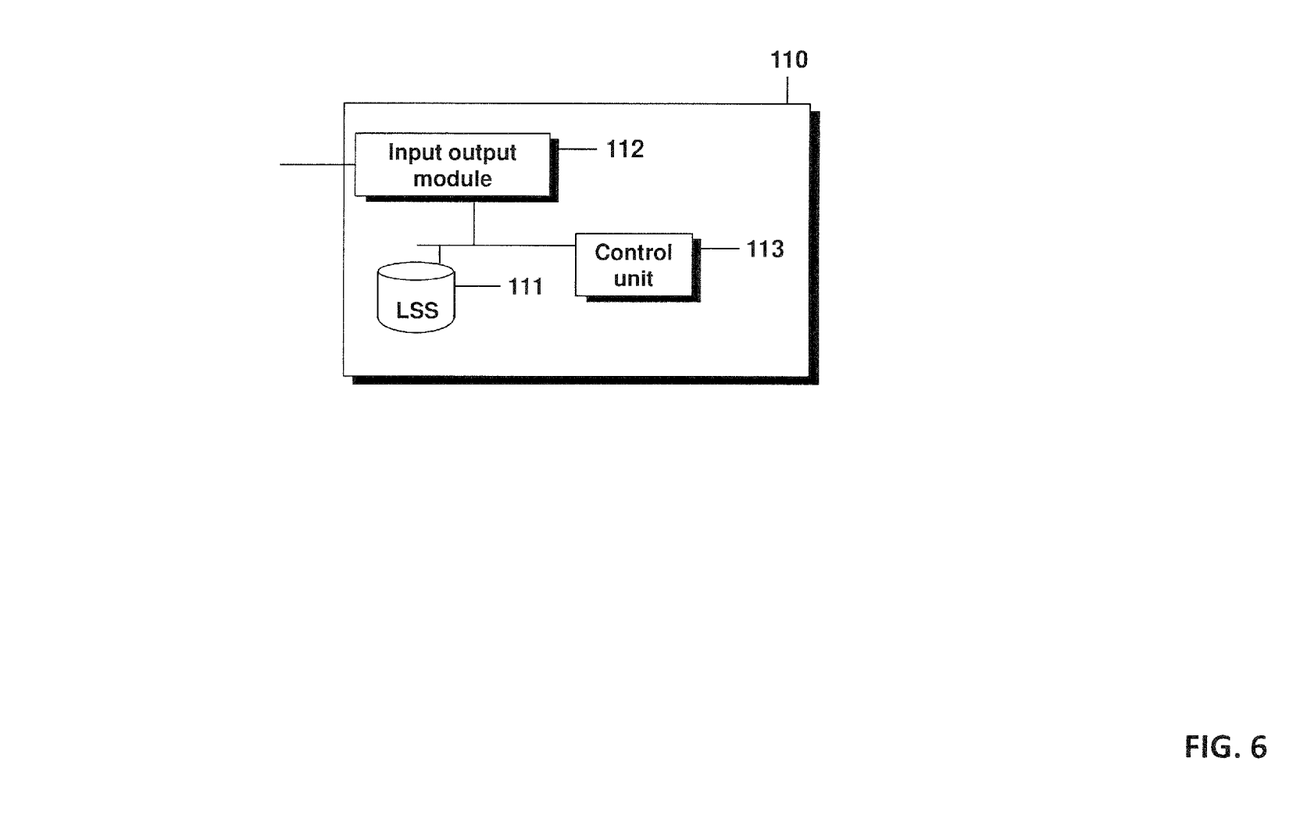
FIG. 6 is a schematic view of a diameter routing unit used in the invention.

In connection with FIG. 6 showing a schematic view of a diameter routing unit such as the diameter routing units 100-130 as described above, the diameter routing unit is explained in more detail. The diameter routing unit 110 shown comprises an input/output module 112 with which the diameter routing unit 110 communicates with the other nodes of the network. The input/output module 112 represents the different reference points and interfaces shown in FIG. 1 with which the DRA can communicate with entities such as PCRFs and the entities 10 to 15 shown in FIG. 1.

The diameter routing unit furthermore comprises a storage unit or a local system storage LLS 111 in which the session-related information is stored as well as the information about the other diameter routing units which forward diameter commands to the same pool of PCRFs. A control unit 113 controls the functioning of the system and especially controls the way the diameter routing behave as discussed in more detail above.

In the embodiment shown in FIG. 6 the different modules 111-113 are shown as separate entities. It should be understood that additional modules and functions may be provided in a diameter routing unit, however, they are not discussed in the context of the present invention. The different modules shown in FIG. 6 need not be incorporated as separate modules, they may be provided in another combination of modules. Furthermore, they may be incorporated by hardware or software or a combination of hardware or software.

Figure 7:
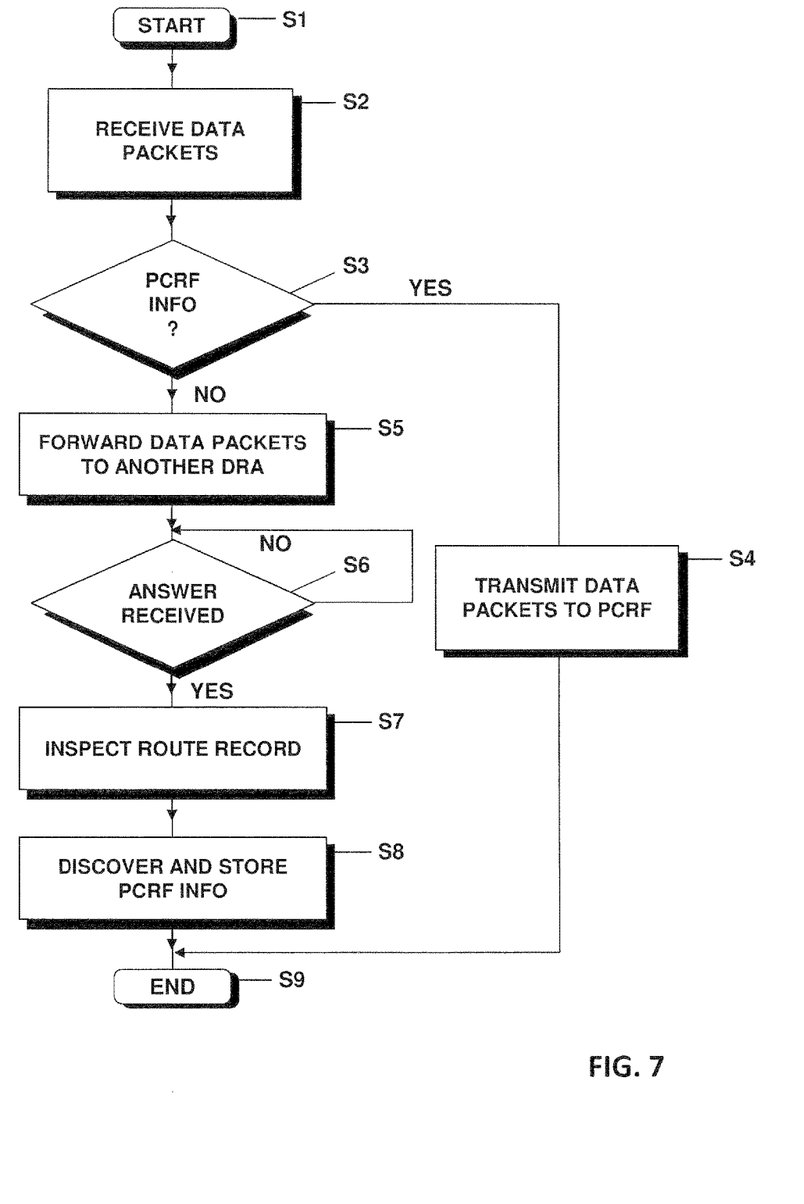
FIG. 7 shows a flow-chart including the steps carried out by a diameter routing unit to handle a received diameter command.

In FIG. 7 the steps are summarized carried out by a diameter routing unit such as diameter routing unit 110 as shown in FIG. 4. In the flow-chart shown the method starts in step S1. In step S2 data packets of a diameter command are received by a diameter routing unit. The second step S2 may correspond to step S4 shown in FIG. 4. In step S3 the diameter routing unit checks in its storage unit whether information is stored which PCRF is handling the session to which the command belongs. If this PCRF information can be found, the data packets of the command are transmitted to the PCRF identified with the help of the stored information (step S4). If, however, no information can be found in the storage unit, the command is forwarded to another diameter routing agent in step S5, which then checks the presence of PCRF information in its storage. The diameter routing unit then waits in step S6 whether the answer command which is returned on the same path is received. If the answer command is received, the route-record is inspected in step S7 and the information about the selected PCRF is discovered and stored in its storage unit in step S8.

The method then ends in step S9.

With the above discussed invention all the problems discussed in the introductory part are solved.

First of all, the dilemma of not being able to decide whether to replicate session information synchronously or asynchronously is solved by avoiding the need for session replication at all. Lacking session information becomes an accepted fact in the present invention.

Furthermore, performance and reliability issues are solved. The session holding diameter routing unit, in the example of FIG. 4 diameter routing unit 100, does not have to wait for a synchronous session replication to the other diameter routing unit, here DRA 110, to be committed. There is no chance of the diameter routing unit 110 not being able to resolve lacking session information in case the other diameter routing unit replicates session information asynchronously.

Furthermore, the problem of node recovery is solved. After a node recovery, e.g. after a node failure or restart, lost session information is implicitly rediscovered on the mated diameter routing unit holding the information.

Furthermore, the problem of superfluous synchronization or replication is avoided. Session information is learned on traffic paths only that are in use and where it is needed.

The invention claimed is:

1. A method, implemented by a diameter routing unit, to route diameter commands of a data packet session using a diameter protocol in a mobile communications network, the diameter routing unit comprising a storage unit storing information about which policy and charging control unit in a pool of policy and charging control units is handling which data packet session and storing information about a presence of an additional diameter routing unit which routes diameter commands of the diameter protocol to the same pool of policy and charging control units as the diameter routing unit, the method comprising:
   receiving a diameter command for a data packet session;
   determining whether to forward the received diameter command to a policy and charging control unit handling the packet data session or to the additional diameter routing unit based respectively on whether or not information about which policy and charging control unit is handling the data packet session is present in the storage unit;
   forwarding the received diameter command according to the determination.

2. The method of claim 1:
   wherein an answer command of a policy and charging control unit is received and a route record indicating the travelled path of the command in the answer command is checked to identify in the route record which policy and charging control unit was selected for the received diameter command;
   wherein information is stored in the storage unit which policy and charging control unit was selected for the received diameter command.

3. The method of claim 2, wherein the answer command of a policy and charging control unit is received from the additional diameter routing unit.

4. The method of claim 1:
   further comprising receiving an answer command, to which an attribute value pair is attached, comprising information which policy and charging control unit is handling which data packet session;
   wherein the information is decoded and written into the storage unit.

5. The method of claim 4, further comprising removing the attached attribute value pair before the answer command is sent to the node from which the diameter command was received.

6. The method of claim 1:
   wherein at least two additional diameter routing units are provided;
   wherein, when no information can be found in the storage unit for the received diameter command of the session, the received diameter command is forwarded to one of the at least two additional diameter routing units.

7. The method of claim 1, further comprising carrying out an asynchronous replication of the information stored in the storage unit to a storage unit of the additional diameter routing unit.

8. The method of claim 1, wherein the diameter command is received from at least one of an application function unit, a gateway, and a traffic detection function unit.

9. A diameter routing unit configured to route diameter commands of a data packet session using a diameter protocol in a mobile communications network, the diameter routing unit comprising:
   a storage circuit configured to store information about which policy and charging control unit is handling which data packet session and to store information about a presence of an additional diameter routing unit which routes diameter commands of the diameter protocol to the same pool of policy and charging control units as the diameter routing unit;
   an input/output circuit configured to receive a diameter command for a data packet session;
   a control circuit configured to check whether information is present in the storage circuit about which policy and charging control unit is handling the session to which the received diameter command belongs; wherein the control circuit is configured to:
      determine whether to forward the received diameter command to a policy and charging control unit handling the packet data session or to the additional diameter routing unit based respectively on whether or not information about which policy and charging control unit is handling the data packet session is present in the storage unit;
      forward the received diameter command according to the determination.

10. The diameter routing unit of claim 9:
    wherein the input/output circuit is configured to receive an answer command of a policy and charging control unit;
    wherein the control unit is configured to check a route record indicating the travelled path of the answer command to identify in the route record which policy and charging control unit was selected for the received diameter command;
    wherein the control circuit is configured to store information in the storage circuit about which policy and charging control unit was selected for the received diameter command of the session.

11. The diameter routing unit of claim 10:
wherein the answer command contains additional information relevant to the data packet session;
wherein the control circuit is configured to decode the additional information and to write it into the storage circuit.

12. The diameter routing unit of claim 9:
wherein the input/output circuit is configured to receive an answer command, to which an attribute value pair is attached, comprising information about which policy and charging control unit is handling which data packet session;
wherein the control circuit is configured to decode the information and to write it into the storage circuit and to remove the attached attribute value pair before the answer command is sent to the node from which the diameter command was received.

13. The diameter routing unit of claim 9, wherein the control unit is configured to carry out an asynchronous replication of the information stored in the storage circuit to a storage circuit of the additional diameter routing unit.

14. A method, performed by a system comprising a diameter routing unit and an additional diameter routing unit, to route diameter commands of a data packet session using a diameter protocol in a mobile communications network, each of the diameter routing units comprising a storage unit storing information which policy and charging control unit is handling which data packet session and the storage unit of the diameter routing unit storing information about a presence of the other diameter routing unit, the diameter routing units routing diameter commands to the same pool of policy and charging control units, the method comprising:
  receiving, at the diameter routing unit, a diameter command for a data packet session;
  determining, by the diameter routing unit, whether to forward the received diameter command to a policy and charging control unit handling the packet data session or to the additional diameter routing unit based respectively on whether or not information about which policy and charging control unit is handling the data packet session is present in the storage unit of the diameter routing unit;
  forwarding, by the diameter routing unit, the received diameter command according to the determination;
  checking, at the additional diameter routing unit if the received diameter command is forwarded to additional diameter routing unit, whether information is present in the storage unit of the additional diameter routing unit about which policy and charging control unit is handling the session to which the received diameter command belongs, and if so, the additional diameter routing unit:
    identifying the policy and charging unit handling the session; and
    forwarding the received diameter command to the identified policy and charging control unit in accordance with the stored information.

15. The method of claim 14:
wherein the additional diameter routing unit receives an answer command from the one of the two policy and charging control units and forwards the answer command to the diameter routing unit;
further comprising the diameter routing unit:
  checking a route record indicating the travelled path of the answer command to identify, from the route record, which policy and charging control unit was selected for the received diameter command in the answer command; and
  storing in its storage unit which policy and charging control unit was selected for the received diameter command.

16. The method of claim 14:
wherein the system comprises a further diameter routing unit;
wherein, when no information is found in the storage unit for the received diameter command at the diameter routing unit, and no information is found by the additional diameter routing unit in its storage unit about which policy and charging control unit is handling the session to which the received diameter command belongs, the diameter command is forwarded to the further diameter routing unit, which checks whether information is present in its storage unit about which policy and charging control unit is handling the session to which the received diameter command belongs, and if so, forwards the received diameter command to one of the policy and charging control units in accordance with the stored information.

17. A system comprising:
a diameter routing unit and an additional routing unit, each of the diameter routing units configured to route diameter commands of a data packet session using a diameter protocol to the same pool of policy and charging control units in a mobile communications network, each of the diameter routing units comprising a storage unit storing information about which policy and charging control unit is handling which data packet session and the storage unit of the diameter routing unit storing information about a presence of the additional diameter routing unit;
wherein the diameter routing unit comprises:
  an input/output circuit configured to receive a diameter command for a data packet session,
  a control circuit configured to:
    determine whether to forward the received diameter command to a policy and charging control unit handling the packet data session or to the additional diameter routing unit based respectively on whether or not information about which policy and charging control unit is handling the data packet session is present in the storage unit of the diameter routing unit;
    forward the received diameter command according to the determination;
wherein the additional diameter routing unit comprises:
  an input/output circuit configured to receive the forwarded diameter command;
  a control circuit configured to check whether information is present in its storage unit about which policy and charging control unit is handling the session to which the forwarded diameter command belongs, and if so:
    identify the policy and charging control unit which is handling the session; and
    forward the forwarded diameter command to the identified policy and charging control unit in accordance with the stored information.

* * * * *